Patented Mar. 17, 1925.

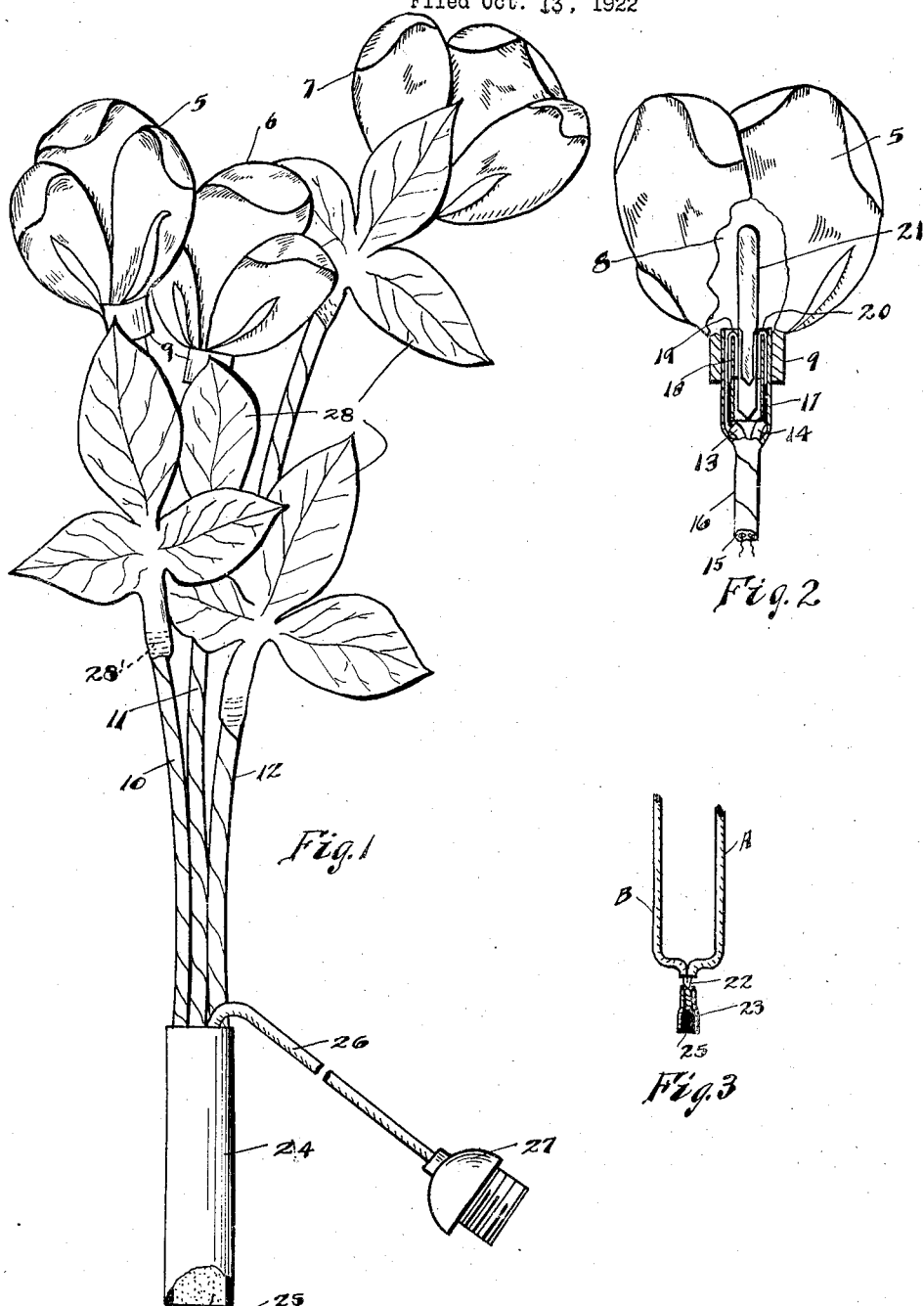

1,530,229

UNITED STATES PATENT OFFICE.

ALEXANDER L. BROWN, OF OAK PARK, ILLINOIS.

ARTIFICIAL FLOWER.

Application filed October 13, 1922. Serial No. 594,261.

*To all whom it may concern:*

Be it known that I, ALEXANDER L. BROWN, a citizen of the United States, and a resident of Oak Park, county of Cook, and State of Illinois, have invented certain new and useful Improvements in Artificial Flowers, of which the following is a specification.

My invention relates to novel improvements in artificial flowers, and has for its principal objects the provision of interchangeable blossom; the provision for illuminating the blossom of the flower; and the provision of an artistic and attractive construction and arrangement, which will be economical in manufacture.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of an artificial flower embodying the invention;

Fig. 2 is an elevational view, partly in section, of one of the blossoms of the flower embodied in the invention; and Fig. 3 is a diagrammatical view, showing the method of connecting the circuit wires embodied in the invention.

Referring to the drawing, and especially Fig. 1, 5, 6 and 7 indicate the removable blossoms, embodied in the invention, of a particular flower formed of non-conductive, translucent material, and each being provided with a hollow interior as indicated at 8 and carrying a socket or hub 9 having a central aperture.

The stems 5, 6 and 7 are indicated at 10, 11 and 12, and are each formed by twisting the circuit wires 13 and 14 which supply electric energy to the lighting agent to be hereinafter mentioned. After the wires 13 and 14 have been twisted to form the stem, they are covered with an insulating material indicated at 15, Fig. 2, and over the insulating material 15 is wrapped a covering of non-combustible material indicated at 16, said covering being colored to give off the appearance of a flower stem. The upper ends of each of the stems carry a socket 17 formed of non-conductive material and consists of an inner non-conductive sleeve 18 carrying contact elements 19 and 20 which in this instance are formed of narrow copper strips and to which the wires 13 and 14 are connected, the socket 17 is arranged and adapted to carry an electric bulb 21 of any size, shape or construction. The electric bulbs arranged in the blossoms 5, 6 and 7 are preferably connected in series and the wire ends are joined together by the method illustrated in Fig. 3 which consists of twisting the end portions 22 of the wires A and B and passing these end portions into a sleeve 23 of non-conductive material, the sleeve 23 being clenched around the twisted end portions after the wire ends are properly arranged therein. After the wires forming the stems have been properly joined together as illustrated in Fig. 3, they are inserted into a cylindrical sleeve 24 of non-conductive material as indicated in Fig. 1 and a composition indicated at 25 of non-conductive material is poured into the sleeve 24 thus binding and insulating the wires from each other, holding the end portions of the wires within the sleeve and filling the sleeves 23. Main circuit wires 26 are connected in circuit with the electric wires forming the stem and are provided with an electric plug 27 of any approved type or construction.

Each of the stems as indicated in Fig. 1 carry a number of removable leaves indicated at 28 which are fixed to the stems 10, 11 and 12 by wire portions indicated at 28' and which can be readily removed to replace leaves which belong to the same family of the particular blossom carried by the stems.

The sleeve 24 binds the flower stems together in the formation of a bouquet and the sleeve can be buried in a flower pot or mounted in a holder of any suitable construction for any purpose.

While I am aware of the fact that there are a variety of designs and constructions of artificial flowers which are adapted to be illuminated, I contend that my selective arrangement which includes the interchangeable blossom, is novel and inasmuch as I intend to form the blossoms of washable material, it will be obvious that it will be an easy matter to remove the blossoms for washing and to substitute other blossoms of the same kind or of any other flower therefor. It is also my intention to form the stem coverings and blossoms of non-combustible material, and as it will be readily seen from the description, there is no danger of short circuit which might cause a fire.

My artificial flower can be manufactured at a nominal cost and will be pleasing and attractive to the human eye.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. An artificial flower including conductor wires having wrappings representing the outer surfaces of flower stems and provided with sockets at their upper ends, a holder adapted to receive the lower end of the stems, interchangeable leaves having wire portions affording means of attachment to the stems, illuminating means mounted in the sockets, blossoms having apertured hubs adapted to receive the sockets, and means retaining the lower ends of the stems within the holder.

2. An artificial flower including conductor wires having wrappings representing the outer surfaces of flower stems and provided with sockets at their upper ends, a holder adapted to receive the lower end of the stems, interchangeable leaves having wire portions affording means of attachment to the stems, illuminating means mounted in the sockets, blossoms having apertured hubs adapted to receive the sockets, means retaining the lower ends of the stems within the holder, and means confined within the holder joining certain of the ends of the conductor wires together.

In testimony whereof I have signed my name to this specification in the presence of two subscribing witnesses.

ALEXANDER L. BROWN.

Witnesses:
JOSHUA R. H. POTTS,
MARGARET AUER.